Figure 1:
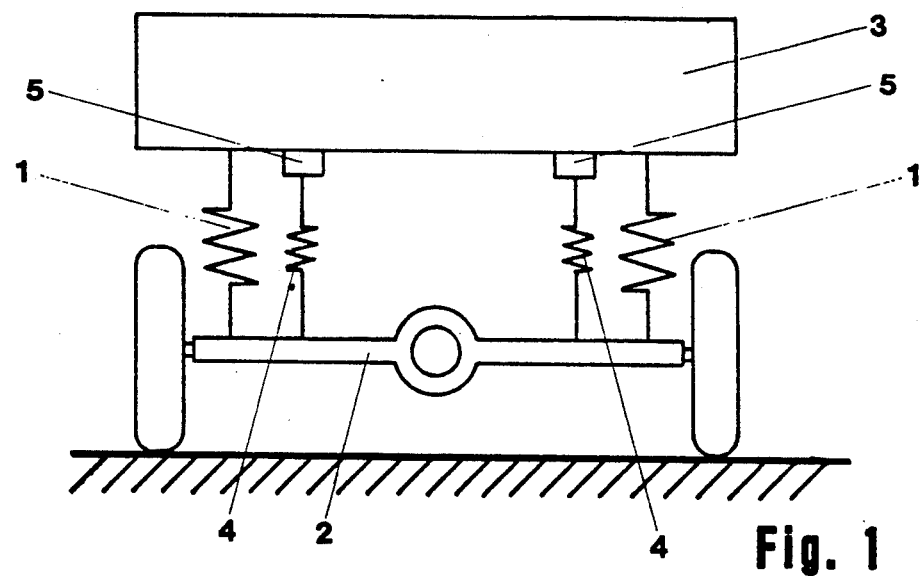

United States Patent
Wirth

Patent Number: 5,161,628
Date of Patent: Nov. 10, 1992

[54] AXLE SPRING BALANCE

[75] Inventor: Johannes Wirth, Zurich, Switzerland

[73] Assignee: Wirth Gallo Messtechnik AG, Zurich, Switzerland

[21] Appl. No.: 634,204

[22] PCT Filed: May 3, 1990

[86] PCT No.: PCT/CH90/00122
§ 371 Date: Jan. 8, 1991
§ 102(e) Date: Jan. 8, 1991

[87] PCT Pub. No.: WO90/13798
PCT Pub. Date: Nov. 15, 1990

[30] Foreign Application Priority Data
May 9, 1989 [CH] Switzerland .................. 1744/89

[51] Int. Cl.$^5$ ................ G01G 19/08; G01G 19/00
[52] U.S. Cl. .................... 177/137; 177/199
[58] Field of Search .............. 177/137, 138, 199

[56] References Cited
U.S. PATENT DOCUMENTS

| | | | |
|---|---|---|---|
| 3,314,491 | 4/1967 | Nelson | 177/137 |
| 3,648,790 | 3/1972 | Bishop | 177/137 |
| 3,867,990 | 2/1975 | Askew | 177/137 |
| 3,955,636 | 5/1976 | Askew | 177/137 |
| 4,623,029 | 11/1986 | Bambauer et al. | 177/137 |
| 4,691,792 | 9/1987 | Shintani . | |
| 4,706,768 | 11/1987 | Kozozian et al. | 177/138 |
| 4,756,374 | 7/1988 | Bailey et al. | 177/137 |
| 4,917,197 | 4/1990 | Waite, Jr. | 177/137 |

*Primary Examiner*—George H. Miller, Jr.
*Attorney, Agent, or Firm*—Johnson & Gibbs

[57] ABSTRACT

The vehicle springs, here leaf spring (7) are the primary spring (and) measuring springs (11) engaged parallel thereto are the secondary springs of elastic force dividers. The part of the weight force of a vehicle (6) flowing over the measuring springs is led over a force sensor (5). A clinometer (12) measures both longitudinal and also transverse inclination of the vehicle (6). The signals of the force sensors (5) and of the clinometer (12) are fed to a computer, which forces the sum of the weight forces that act upon the (here) four force sensors (5). Besides the inclination correction mentioned, the computer performs all the weighing arithmetic operations, such as tare weight formation, weight difference determination, and also calculates transport performance magnitudes.

12 Claims, 5 Drawing Sheets

AXLE SPRING BALANCE

The present invention relates to a weighing device mounted on an elastically sprung vehicle for the determination of the weight of the transported goods; in particular it relates to weighing devices in which the vehicle spring suspension acts as primary spring of a spring reduction, and a force sensor is acted upon by a relatively gentle secondary spring acting parallel to the primary spring.

Such weighing devices are known per se, thus, for example, from U.S. Pat. No. 4,706,768 and numerous older publications. All have in common the feature that the stroke of the vehicle, which is typically sprung by leaf or coil springs is with respect to the wheel axles the measurement of the vehicle load. This stroke is either visually detected (thus, for example, in DE 26 40 283 A1, FR 78 27 261 A, GB 2,123,569 A), measured by means of ultrasound (U.S. 4,623,029) or ascertained over the spring pressure of a linear spring engaged parallel to the vehicle spring (U.S. 4,706,768). A parallel-switched measuring spring is known also from U.S. 3,858,173. Its length change, however, is used only for the triggering of a contact in the event that a prescribed maximum load is reached or exceeded.

The solution representing the state of the art from U.S. 4,706,768 has the disadvantage that the distance sensor which receives the part of the axle load to be led off over the measuring spring remains retracted in the normal operation of the vehicle and is to be extended only for the weighing operation. The extending mechanism provided for this is extremely complicatedly constructed and correspondingly expensive in the production and in the maintenance. The device is provided, therefore, also only for operation on the standing vehicle; during travel the distance sensor remains retracted. All the known solutions, moreover, are incapable of taking into account arbitrary inclined positions of the vehicle, although this is claimed in U.S. 4,623,029.

The problem that is to be solved with the present invention is to create a weighing device on vehicles—preferably trucks—which, on the one hand, overcomes the disadvantages of the known devices, is suitable under any practically occurring sloping of the vehicle and, in the process, correctly determines the weight of the load; this both at a standstill and also during travel. The solution of the above problem is given in the characterizing portion of patent claim 1.

With the aid of the drawing the invention is explained in detail.

Figure 4:
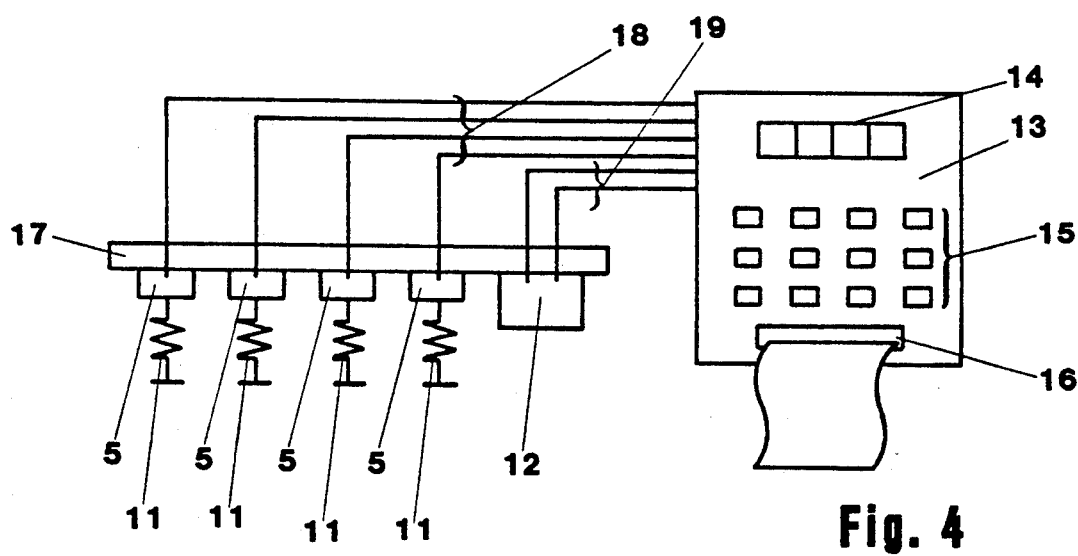
Figure 2:
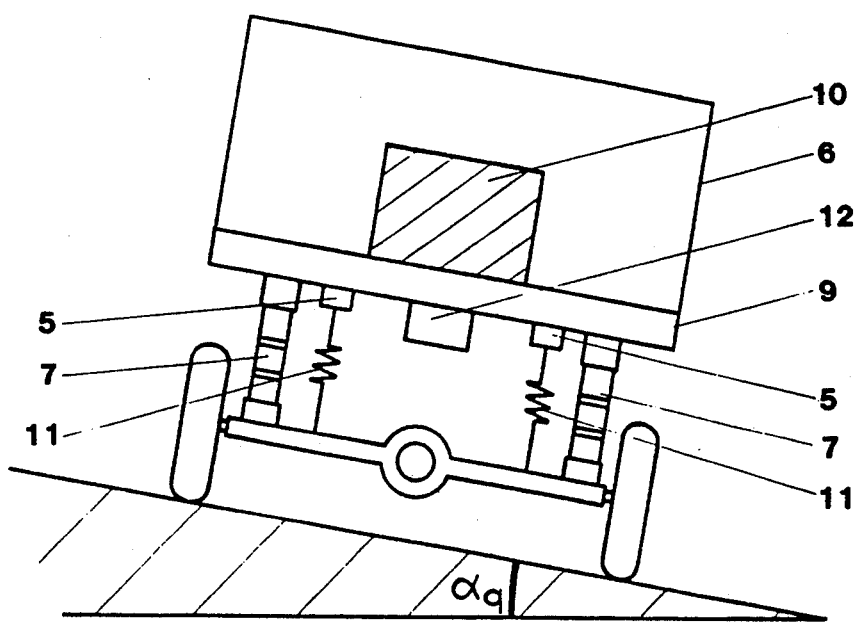
Figure 3:
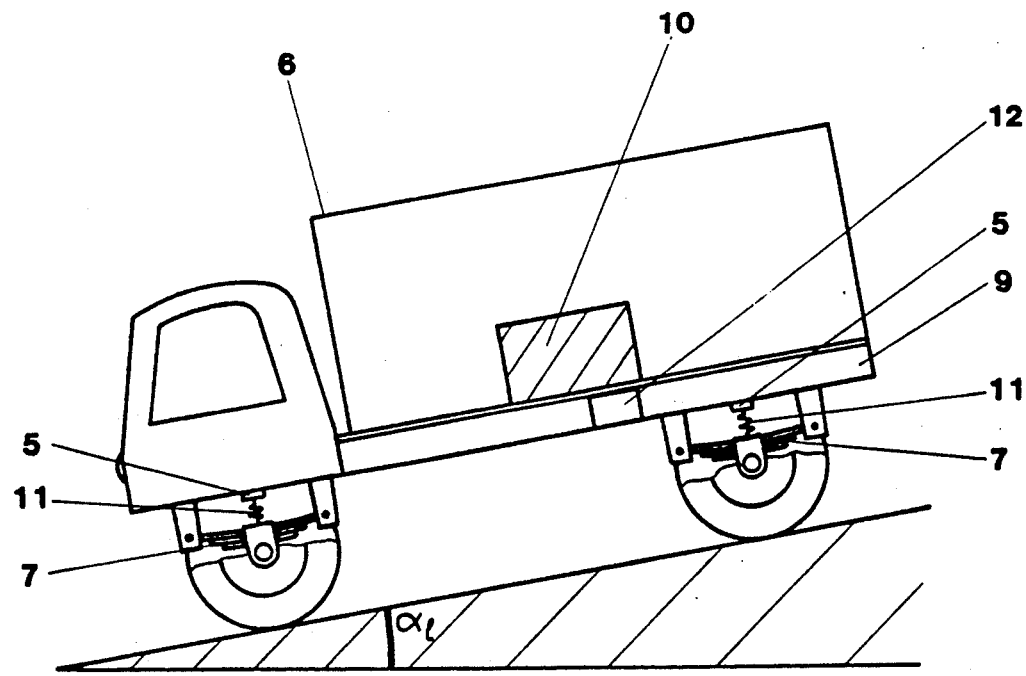
Figure 5:
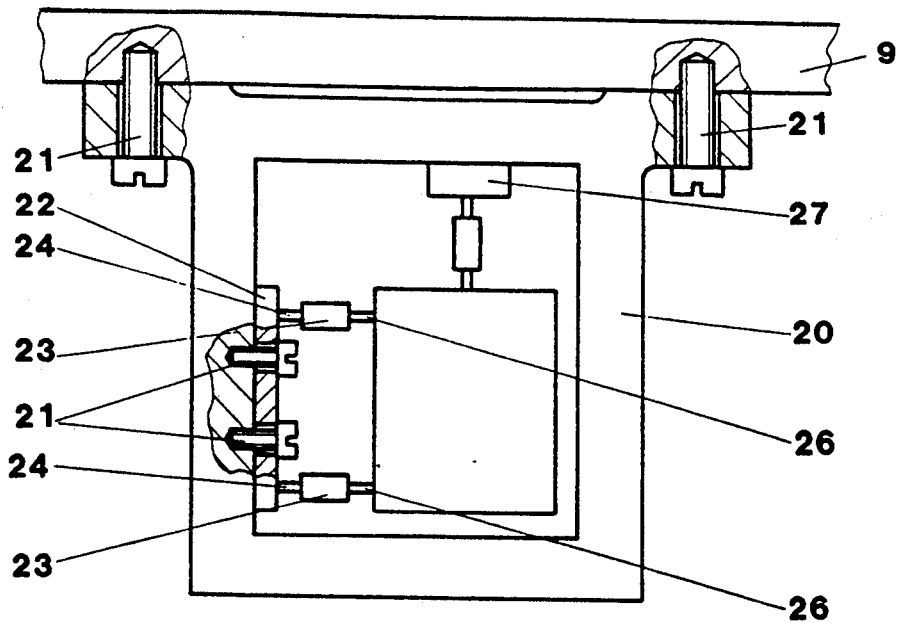
Figure 6:
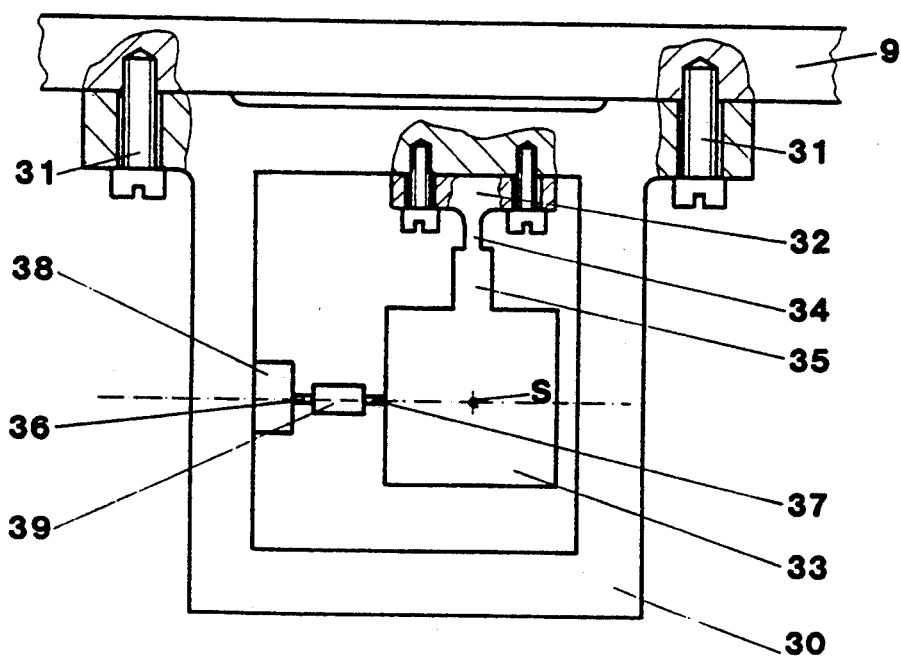
Figure 7:
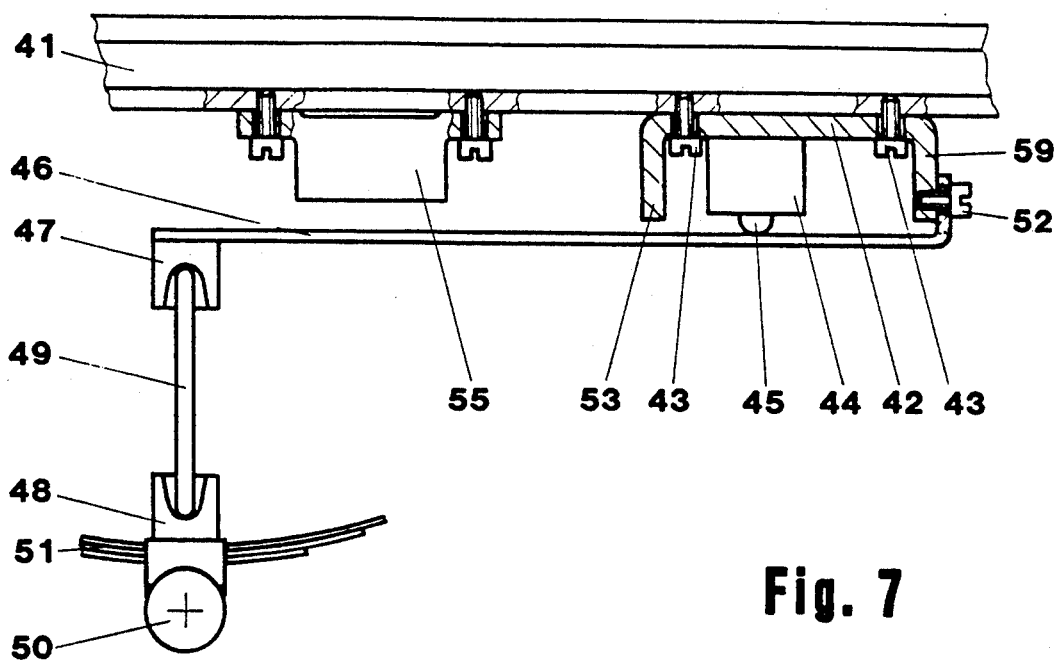
Figure 8:
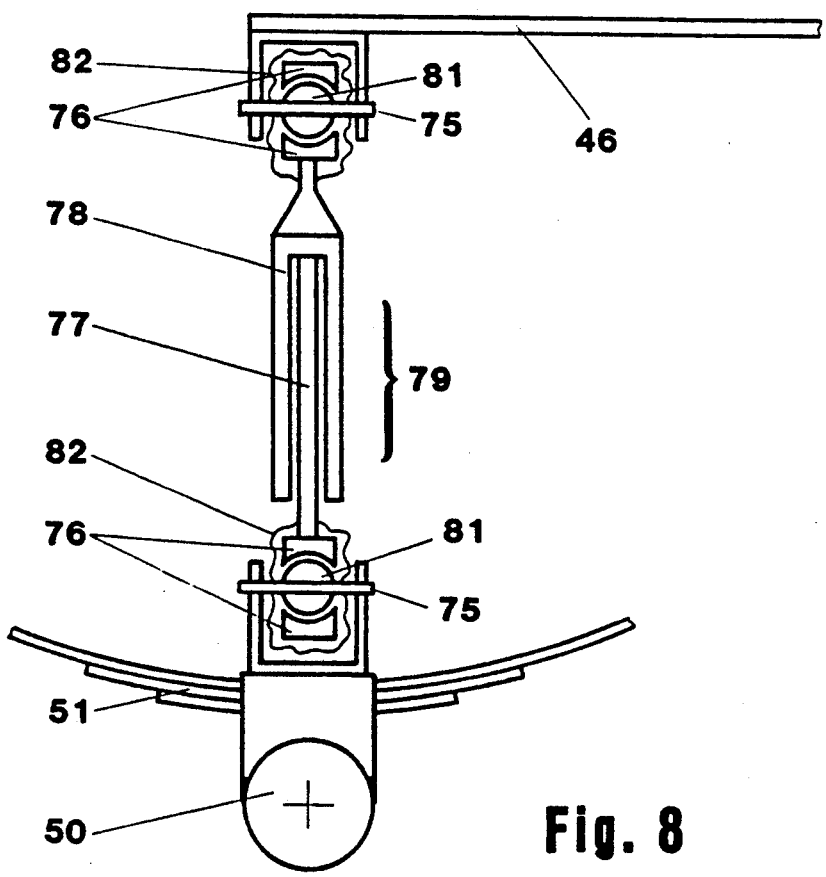
Figure 9:
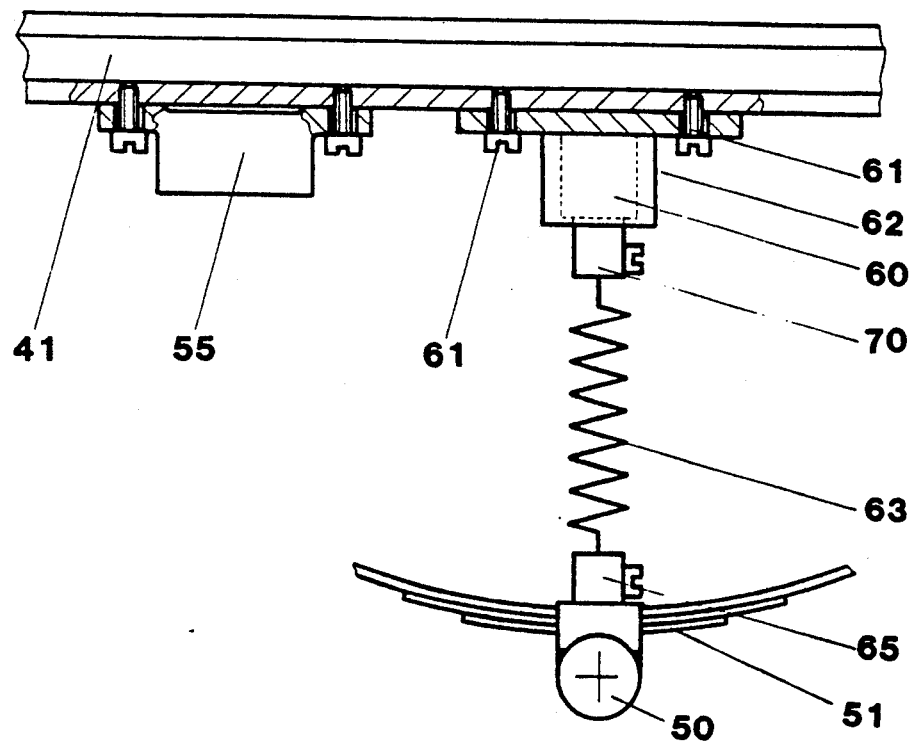

FIG. 1 shows the measuring principle corresponding to the generic term,

FIG. 2 a first schematic representation of the weighing device of the invention, FIG. 3 a second schematic representation of the weighing device of the invention, FIG. 4 a third schematic representation of the weighing device of the invention, FIG. 5 a first example of execution of a clinometer, FIG. 6 a second example of execution of a clinometer, FIG. 7 a first example of execution of a measuring system, FIG. 8 a variant of a detail of FIG. 7, FIG. 9 a second example of execution of a measuring system.

FIG. 1 schematically shows the measuring principle underlying the generic term. Generally represented vehicle springs 1, standing for leaf springs or coil springs, are supported each upon an end of an axle 2 and, together with other springs (not represented) carry the vehicle superstructure. A measuring spring 4 running parallel to each vehicle spring 1, the hardness of which spring 4 is substantially less than that of the vehicle spring 1, leads off a small part (corresponding to the ratio of the hardnesses) of the weight constituent of the vehicle superstructure 3 falling to this spring 1 likewise onto the axle 2. In series to each measuring spring 4 there is present in each case a force sensor 5 of a construction known per se. Essentially, each wheel (or twin wheel) of the vehicle is provided with a device according to FIG. 1. According to the construction type of the vehicle it is thinkable that in the case of a double axle chassis only the one axis is equipped with two measuring devices according to FIG. 1.

According to the state of the art the force sensor 5 measures a small proportional part of the weight force of the vehicle superstructure acting on the one wheel of the axle A summation over all the wheels or all the force sensors 5 yields the total weight of the vehicle superstructure 3. The tacit precondition for this is a flat, horizontal roadway. If because of an inclined roadway the vehicle superstructure 3 is standing oblique, then the full weight is no longer measured, since weight components are led off over longitudinal forces and/or lateral guiding forces directly onto the roadway.

In FIGS. 2 and 3 there is schematically represented a first example of execution of a weighing device according to the invention.

The vehicle 6 equipped with a weighing device according to the invention with a bridge 9 stands in FIG. 2 on a laterally inclined roadway, in FIG. 3 on a roadway inclined in traveling direction. In the regular case both inclinations occur combined in arbitrary proportions. The vehicle 6 is equipped here—in correspondence to the number of wheels—with four force sensors 5, in FIGS. 2, 3 in each case only two being visible. The vehicle 6 is borne by leaf springs 7 of usual construction type; instead of leaf springs 7 there are also used coil springs, combined with guide rods (not represented). In the rear axle zone there is a stabilizer (not represented) which brings it about that also in the case of asymmetrical loading of the bridge 9 the load is distributed uniformly on the two rear leaf springs 7, and therefore generates substantially equal stroke of both leaf springs 7.

The stroke brought about by a schematically represented load 10 of the leaf springs 7 is now transferred to four measuring springs 11, which are significantly softer than the leaf springs 7, and therefore do not appreciably change the suspension characteristics of the vehicle. The force generated by the compression of the measuring-springs is transferred to the force sensors 5, which are for example of the vibrating-string type; without restriction of the thought of the invention, other force sensors corresponding to the state of the art are possible. By reason of the inclined roadway, parts of the weight forces both of the whole vehicle 6 and also of the load 10 are led off tangentially onto the roadway, so that the sum of all the forces measured by the force sensors 5 is less than the effective total weight (always without the driving mechanism proper, consisting of wheels, axles and, in part, guide rods and stabilizers). If $G_{eff}$ is the effective total weight, and $F_G$ is the sum of the forces determined by the force sensors 5, then $$F_G = \cos\alpha_q \times \cos\alpha_q \times G_{eff}$$

As long as a weighing device mounted on the vehicle itself serves only to avoid possible overloads, the measuring errors caused by roadway slopes play no role. If, however, the aim is to determine travel performances with reference to customers (weight ×distance) for statistical or tariff purposes, for example, in piece goods traffic, or in the collecting of goods such as trash caused related costs, then the consideration of the inclination angles $\alpha_q$ and $\alpha_l$ is necessary. In addition to the elements mentioned, the example of execution according to FIGS. 2, 3, presents a clinometer 12, with which the inclination angles $\alpha_q$ and $\alpha_l$ are determined.

In FIG. 4 there are represented four force sensors 5 with measuring springs and the clinometer 12 in schematic form. They are fastened to a schematically drawn bridge 17 and are acted upon by the forces of the differently tensioned measuring springs 11. The clinometer 12 measures the inclination angles $\alpha_q$ and $\alpha_l$. The electrical magnitudes corresponding to the measurement values are conveyed over lines 18 and 19 to a computer 13. This contains the storage and computing means necessary according to the state of the art (not represented). Further it presents a display field 14 and a key field 15 as well as a printer 16 for the output of the data essential before, during and after the trip.

The number four for the force sensors 5 and measuring springs is in no way essential to the invention; there can be provided either fewer or also (in the case of multiaxis trucks) more than the four force sensors mentioned. The computer 13 is preferably installed in the driver's compartment of the vehicle 6. The computer 13 is equipped according to the state of the art for weighing technical computing operations such as tare weight formation, determination of the weight of added loads and unloadings which are yielded on a collecting and-/or distributing trip.

In FIGS. 5 to 8 the electrical connections which are designated in FIG. 4 with lines 18, 19, are consistently omitted, but are essential to the invention.

FIG. 5 shows a first example of execution of a clinometer essential to the invention. To a suitable place of the bridge 9 of the vehicle 6 there is fastened a solid box-form frame 20, for example with screws 21. Inside the frame 20 there is present a base plate 22, which is screwed onto the frame 20. With the base plate 22 there are connected two substantially horizontal and parallel guide rods 23 over an elastic joint 24 each, while a reference mass 25 is connected over further elastic joints 26 with the guide rods 23. The reference mass 25 is fixed by a force sensor 27—which is preferably of the same type as the force sensors 5 according to FIGS. 2, 3—which is likewise fastened to the frame 20. If the vehicle 6 and therewith also the bridge 9 stands horizontal, then the direction of the weight force of the reference mass 25 is vertical; the force sensor 27 measures, therefore, its weight or a reduced proportional weight brought about by the elastic joints 24, 26. Inclination of the vehicle 6 through the angle $\alpha_q$ causes a reduction of the weight force by the factor $\cos\alpha_q$; inclination through $\alpha_l$ causes such a reduction by the $\cos\alpha_l$; If both inclinations occur combined, then the reduction factor of the weight constituent of the measured force is $\cos\alpha_q \cos\alpha_l$. The computer 13 from the measurement values of the force sensors 5 and of the measurement value of the force sensor 27 forms the mass of the vehicle 6 and its additional load. The taking into account of elastic bias tensions of the force sensors 5, 27 is state of the art and is known, for example, from the European patent EP A1 (WO 89/03 023).

FIG. 6 shows a second example of execution of a clinometer essential to the invention. A frame 30, which is fastened to the bridge 9 with screws 31, carries on a base plate 32 screwed fast to the frame 30 pendulum mass 33, which is rotatably borne on the base plate 32 by means of an elastic joint 34 about a perpendicular to the drawing plane. To the side of the pendulum mass 33 there is fastened to the frame 30 a force sensor 38 which is, for example, of the same type as the force sensors 5 or 27. The pendulum mass 33 is connected with the force sensor 38 by a bar 39 which can transfer pressure and pull forces, in such a manner that the line of application, substantially horizontal and running through the bar 39 runs through the center of gravity S of the pendulum mass 33. Further, the bar 39 carries two bending joints 36, 37, in order to avoid or to reduce the arising of shearing forces on the force sensor 38.

When the longitudinal direction of the vehicle 6 is parallel to the drawing plane, then, if $\alpha_l \neq 0$, a force acts on the force sensor 38; as pull force if the rear end of the vehicle 6 lies lower than the front; as pressure force if the inclination angle is reversed. This force (without consideration of elastic forces) is $$F_l = k \cdot m g \cdot \sin\alpha_l$$

where
k signifies a proportionality factor dependent on the geometry
m the mass of the pendulum mass 33
g the gravity acceleration.

Inclusion of elastic bias tensions or partial forces is known from the patent application WO 89/03 023 mentioned. While, therefore the clinometer described here determines the longitudinal inclination of the vehicle, for the measurement of the transverse inclination $\alpha_q$ there is provided an identical clinometer (not represented). Its pendulum direction runs, therefore, transversely to the vehicle. Preferably both clinometers are fastened to the same frame 30. Here there holds then, correspondingly, $$F = k \cdot m \cdot g \cdot \sin\alpha_q$$

Since the magnitudes k, m, g are determined constants, determinable once and for all, which are stored in the computer 13, the inclination angles $\alpha_q$, $\alpha_l$ can easily be determined from the measured forces $F_q$ and $F_l$, so that the effective weight $G_{eff}$ of vehicle 6 and load can be determined according to the equation $$F = \cos\alpha_q \cdot \cos\alpha_l \cdot G_{eff}$$

FIG. 7 shows a first example of execution of a device which measures the force acting on a wheel. To a longitudinal strut 41—for example with screws 43—there is fastened a solidly constructed box 42 opening downward. In FIG. 7 the box 42 is represented in section. The one end of a wall of the box 42 carries, for example by means of screws 52, a long leaf spring 46 bent-off at the end, and functions, therefore, as carrier 59 for the leaf spring 46. Inside the box 42 a force sensor 44 is fastened with a force-receiving member 45. The force sensor is made watertight and dust-tight. The free end of the leaf spring 46 bears a pivot bearing 47. A pivot bearing 48 corresponding to this is fastened to the axle 50 of the vehicle. The type of fastening is only schematically given, since it can be executed differently in each case accordiry to producer and type of vehicle. Between the pivot bearings 47, 48 a bar 49 is inserted, which transfers the vertical movements of the axle 50—the stroke of only partially drawn leaf springs 51—onto the leaf spring 46. This reduces the movement of the axle 50 and translates the force acting on the pivot bearing according to the spacings present between the elements designated with 47, 45, 52, and acts with this translated force upon the force sensor 44. An edge designated with 53 of the wall of the box 42 acts as overload protection of the force sensor 44 in the event of excessive bending of the leaf spring 46.

A clinometer 55, either of the type according to FIG. 5 or according to FIG. 6, is fastened to the strut 41 likewise in the vicinity of the box 42. In a variant (not shown in the drawing) the clinometer 55 is likewise accommodated in the box 42. Not represented are protective measures for the leaf spring 46, the two pivot bearings 47, 48, the bar 49 and the box 42. These may consist in protective plates and/or plastic hoods or bellows for the entire apparatus or parts of the same.

It is an obvious idea in the sense of the invention to make the box 42 differently, for example to omit the side walls lying parallel to the paper plane, so that there appear only the elements drawn in section, namely the carrier 59 and the edge 53. What is essential is that the carrier 59 is shifted by about the length of the leaf spring 46 from the vertical line passing through the axle 50, so that the bar 49 runs vertically upward from the axle. Therewith false measurements are avoided that arise when through braking of the vehicle the one side of the leaf spring 51 is more heavily loaded than the other.

FIG. 8 shows a variant to FIG. 7. The connection of the vehicle axle 50 with the leaf spring 46 is here established by a stilt 79. This consists of a bar 77 and of a sleeve 78, which are slidable within one another but fixed with respect to one another. The bar 77 is fastened below, the sleeve 78 above, each to a ball joint. A pin 75 each is applied below to the axle 50 and above to the leaf spring 46, in which arrangement the axial direction of the pin 75 is substantially perpendicular to the axle 50. Ball zones 81 are seated on the pins 75. Upon the ball zones 81 there are likewise emplaced ball zone-form bearing boxes 76. The Cardan joints consisting of pins 75, ball zones 81 and bearing boxes 76 are each enclosed for protection against outside influences by a bellows 82, which is tightly joined to the adjacent components. This variant of the invention facilitates the assembling and disassembling both of the measuring device and also of the vehicle components connected with it.

In FIG. 9 there is represented a second example of execution of an apparatus that measures the force acting on the end of an axle. To the strut 41 there is fastened a dustproof and watertight box 60 with screws 61. It contains the force sensor 62 with force receiving member 70. On this there acts a coil spring 63. The other end of the coil spring 63 is connected with an end piece 65 which is fastened to the axle 50.

The effect line of the force transferred through the coil spring 63 runs vertically upward from the axle 50, so that the force sensor 62 is located substantially vertically over the axle 50. Again, the type of fastening is open for the reasons already mentioned. The coil spring 63 is in this example of execution installed under pull bias tension. The stroke of the leaf spring 51 leads, therefore, to a reduction of the pull force acting on the force receiving member 70. The advantage of this type of execution lies in that the coil spring 63 can be constructed relatively light and without supporting device.

A variant to this (not shown in the drawing) consists in a coil spring that can transfer pressure forces and thus is constructed stronger. The force sensor is then likewise laid out for the reception of pressure forces. Also in FIG. 9 the clinometer 55 is fastened to the strut 41, but it can likewise be accommodated in the box 6 itself.

The frictional forces occurring in the spring suspension systems of automobiles, especially of trucks, which are inherent also in the weighing device according to the invention, bring about hysteresis characteristics of the weighing characteristic curves. This is overcome by the vibrations that are transmitted from the running motor or from the driving operation onto the spring suspension and measuring system.

I claim:

1. A weighing device mounted on an elastically sprung vehicle for the determination of the weight of the transported goods, in which a vehicle spring (51) acts as primary spring of a spring reduction, and a force sensor (5, 44, 62) is acted upon by a relatively soft secondary or measuring spring (7, 8, 11, 46, 63) acting parallel to the primary spring, characterized in that each side of each axle (50) of the vehicle presents such a weighing device, consisting of measuring spring (7, 8, 11, 46, 63) and force sensor (5, 44, 62), to the vehicle frame there is fastened a clinometer (12) with which there can be ascertained the inclination of the vehicle both in longitudinal and also in transverse direction ($\alpha_l$ and $\alpha_q$ respectively), both the weighing devices and also the clinometer (12) give off electrical signals corresponding to the measurement values, the force sensors (5, 44, 62) and the clinometer (12) are connected over lines (18, 19) with a computer (13) which from the electrical signals mentioned can determine the total weight of the vehicle superstructure and of a load and by further computing steps the weights of added loads and unloadings.

2. Weighing device according to claim 1, characterized in that the measuring spring is a leaf spring (46).

3. Weighing device according to claim 2, characterized in that the leaf spring (46) is borne by a carrier (59) which is fastened to a strut (41) of the vehicle, the carrier (59) is removed by about the length of the leaf spring (46) from a vertical line running through the axle (50), the free end of the leaf spring (46) carries a pivot bearing (47) into which there engages the upper end of a vertical bar (49), the lower end of which is borne in a substantially like-formed pivot bearing (48), and the pivot bearing (48) is fastened to the axle (50), the force sensor (44) is fastened, in the longitudinal direction of the leaf spring (46), between the carrier (59) and the edge (53) likewise to the strut (41), the leaf spring (46) presses over a force receiving member (45) onto the force sensor (44), the upward movement of the leaf spring (46) is limited by an edge (53) fastened to the strut (41), which edge acts as overload protection for the force sensor (44).

4. Weighing device according to claim 3, characterized in that
the carrier (59) and the edge (53) are parts of a downward-open box (42) in which also the force sensor (44) is fastened.

5. Weighing device according to claim 2, characterized in that
the leaf spring is borne by a carrier (59) which is fastened to a strut (41) of the vehicle,
the carrier (59) is removed by about the length of the leaf spring (46) from a vertical line running through the axle (50),
the free end of the leaf spring (46) carries a ball joint, consisting of a pin (75), a ball zone (81) fastened to this and of a bearing box (76) swingable about this and likewise of ball zone shape, in which system the axis of the pin (75) stands substantially perpendicular to the axle (50) to which a ball joint constructed of like elements (75, 76, 81) is fastened,
to the upper bearing box (76) there are fastened a sleeve (78), to the lower bearing box (76) a bar (77), the bar (77) being slidably borne in the sleeve (78), but both parts (77, 78) are fixed with respect to one another by the bias tension of the leaf spring (46),
the two ball joints mentioned are each surrounded by a bellows (82) which is tighly joined to the adjacent components.

6. Weighing device according to claim 1, characterized in that the measuring spring is a coil spring (63).

7. Weighing device according to claim 6, characterized in that
the coil spring (63) extends vertically upward from the axle (50) to which it is fastened by means of an end piece (65), is connected at its upper end with a force receiving member (70) of the force sensor (62) and exerts pull forces on this latter.

8. Weighing device according to claim 6, characterized in that
the coil spring (63) extends vertically upward from the axle (50) to which it is fastened by means of an end piece (65), is connected at its upper end with a force receiving member (70) of the force sensor (62) and exerts pressure forces on this latter.

9. Weighing device according to claim 2, 3, 4 or 5, characterized in that
the clinometer (15) presents a reference mass (25) which is guided by two substantially horizontal and parallel guide rods (23) with elastic joints (24, 26) parallel in vertical direction,
the reference mass (25) is fixed by a force sensor (27).

10. Weighing device according to claims 2, 3, 4 or 5, characterized in that
the clinometer (12) consists of a twofold execution of all the following elements, namely a pendulum mass (33) which is rotatably borne by means of an elastic joint (34) on a substantially horizontal base plate (32), and that to the pendulum mass (33) there is fastened a substantially horizontally running bar (39) articulately and in force closure, which acts upon a force sensor (38) which is likewise fastened to the base plate (32), in such a manner that the effect line running through the bar (39) passes through the center of gravity (S) of the pendulum mass (33),
Further, the axes of the elastic joints (34) lie horizontal and perpendicular to one another, in such a manner that the one axis stands in traveling direction, and the other transversely thereto.

11. Weighing device according to any of claims 6, 7 or 8, characterized in that
the clinometer (12) presents a reference mass (25), which is guided by two substantially horizontal and parallel guide rods (23) with elastic joints (24, 26) parallel in vertical direction,
the reference mass (25) is fixed by a force sensor (27).

12. Weighing device according to any of claims 6, 7 or 8, characterized in that
the clinometer (12) consists of a twofold execution of all the following elements, namely a pendulum mass (33) which is rotatably borne on a substantially horizontal base plate (32) by means of an elastic joint (34), and that to the pendulum mass (33) there is connected articulately and in force closure a substantially horizontally running bar (39), which acts upon a force sensor (38) which is likewise fastened to the base plate (32), in such a manner that the effect line running through the bar (39) passes through the center of gravity (S) of the pendulum mass (33),
further, the axes of the elastic joints (34) lie horizontal and stand perpendicular to one another, in such manner that the one axis stands in traveling direction, and the other transversely thereto.

* * * * *

UNITED STATES PATENT AND TRADEMARK OFFICE
CERTIFICATE OF CORRECTION

PATENT NO. : 5,161,628
DATED : November 10, 1992
INVENTOR(S) : Johannes Wirth

It is certified that error appears in the above-identified patent and that said Letters Patent is hereby corrected as shown below:

| | |
|---|---|
| Column 2, line 23 | After "axle" insert --2.-- |
| Column 2, line 58 | After "springs" insert --11-- |
| Column 3, line 18 | After "springs" insert --11-- |
| Column 3, line 31 | After "springs" insert --11-- |
| Column 4, line 9 | After "30" insert --a-- |

Signed and Sealed this

Fifth Day of October, 1993

Attest:

BRUCE LEHMAN

*Attesting Officer*     *Commissioner of Patents and Trademarks*